(12) United States Patent
Han et al.

(10) Patent No.: US 10,371,321 B2
(45) Date of Patent: Aug. 6, 2019

(54) ANCHOR STRUCTURE AND LNG STORAGE TANK INCLUDING THE SAME

(71) Applicant: KC LNG TECH CO., LTD., Busan (KR)

(72) Inventors: Hae Chul Han, Incheon (KR); Ihn Soo Yoon, Incheon (KR); Kyo Kook Jin, Incheon (KR); Byung Taek Oh, Incheon (KR); Yong Bum Cho, Seoul (KR); Kun Hyung Choe, Seoul (KR)

(73) Assignee: KC LNG Tech Co., Ltd., Busan (KR)

( * ) Notice: Subject to any disclaimer, the term of this patent is extended or adjusted under 35 U.S.C. 154(b) by 268 days.

(21) Appl. No.: 15/325,702

(22) PCT Filed: Jul. 9, 2015

(86) PCT No.: PCT/KR2015/007113
§ 371 (c)(1),
(2) Date: Jan. 11, 2017

(87) PCT Pub. No.: WO2016/006940
PCT Pub. Date: Jan. 14, 2016

(65) Prior Publication Data
US 2017/0159888 A1    Jun. 8, 2017

(30) Foreign Application Priority Data

Jul. 11, 2014   (KR) .................. 10-2014-0087462
Jul. 11, 2014   (KR) .................. 10-2014-0087470
Jul. 11, 2014   (KR) .................. 10-2014-0087473

(51) Int. Cl.
*F17C 1/12*     (2006.01)
*F17C 13/08*    (2006.01)
(Continued)

(52) U.S. Cl.
CPC .............. *F17C 13/08* (2013.01); *B63B 25/16* (2013.01); *B65D 90/06* (2013.01); *F16B 5/02* (2013.01);
(Continued)

(58) Field of Classification Search
CPC .......... F17C 13/08; F17C 13/082; F17C 1/12; F17C 2225/0161; F17C 2203/0619
See application file for complete search history.

(56) References Cited

U.S. PATENT DOCUMENTS 3,401,816 A * 9/1968 Witt ..................... B60P 7/13
                                                220/476
3,730,375 A    5/1973 Reed et al.
2014/0124086 A1  5/2014 Jean et al.

FOREIGN PATENT DOCUMENTS

JP          54-20912 A    2/1979
JP          54-167764 U   11/1979
(Continued)

OTHER PUBLICATIONS

Office Action dated Nov. 21, 2017 in corresponding Japanese Patent Application No. 2017-522305—6 pages.
(Continued)

*Primary Examiner* — Stephen J Castellano
(74) *Attorney, Agent, or Firm* — Knobbe Martens Olson & Bear LLP

(57) ABSTRACT

The present invention relates to an anchor structure able to actively cope with hull deformation, and to a liquid natural gas storage tank and a production method for a liquid natural gas storage tank comprising the anchor structure. According to one embodiment of the present invention, an anchor structure is provided wherein an anchor structure, for linking a sealing wall and an inner wall of a liquid natural gas storage tank, comprises: an anchor member adapted such that a joining part, which is joined to the sealing wall, can
(Continued)

slide horizontally; and a thermally insulating material formed around the anchor member.

13 Claims, 8 Drawing Sheets

(51) Int. Cl.
*B63B 25/16* (2006.01)
*B65D 90/06* (2006.01)
*F16B 5/02* (2006.01)
*F17C 3/00* (2006.01)
*F16B 33/00* (2006.01)

(52) U.S. Cl.
CPC .............. *F17C 1/12* (2013.01); *F17C 3/00* (2013.01); *F17C 13/081* (2013.01); *F17C 13/082* (2013.01); *F17C 13/083* (2013.01); *F16B 33/004* (2013.01); *F17C 2203/0333* (2013.01); *F17C 2203/0604* (2013.01); *F17C 2203/0619* (2013.01); *F17C 2205/0119* (2013.01); *F17C 2205/0192* (2013.01); *F17C 2221/033* (2013.01); *F17C 2225/0161* (2013.01); *F17C 2225/033* (2013.01); *F17C 2260/044* (2013.01); *F17C 2270/0105* (2013.01)

(56) References Cited

FOREIGN PATENT DOCUMENTS

| JP | 63-220000 A | 9/1988 |
| JP | 7-217796 A | 8/1995 |
| JP | 08-026387 A | 1/1996 |
| JP | 11-180494 A | 7/1999 |
| JP | 2007-525624 A | 9/2007 |
| JP | 2007-292282 A | 11/2007 |
| KR | 10-0499713 B1 | 7/2005 |
| KR | 10-0644217 B1 | 11/2006 |
| KR | 10-0981416 B1 | 9/2010 |

OTHER PUBLICATIONS

Notice of Allowance of corresponding to Japanese Patent Application No. 2017-522305—4 page (dated Jun. 5, 2018).
International Search Report dated Oct. 15, 2015 of PCT/KR2015/007113 which is the parent application and its English translation—4 pages.

* cited by examiner

ANCHOR STRUCTURE AND LNG STORAGE TANK INCLUDING THE SAME

This application is the national stage (Rule 371) of PCT/KR2015/007113 filed Jul. 9, 2015.

TECHNICAL FIELD

The present invention relates to an anchor structure and an LNG storage tank including the same.

BACKGROUND ART

Liquefied natural gas (LNG) is obtained by liquefying natural gas, one of the fossil fuels, and LNG storage tanks may be divided into onshore storage tanks installed on the ground or buried in the ground and mobile storage tanks installed in vehicles such as automobiles and ships, depending on installation location.

Since LNG has a danger of explosion when exposed to impact and is kept under cryogenic conditions, a storage tank for LNG has a structure in which impact resistance and liquid tightness are firmly maintained.

In addition, in contrast to onshore storage tanks where sloshing of LNG is negligible, LNG storage tanks installed in automobiles and ships should be able to withstand mechanical stress due to the sloshing. However, since LNG storage tanks installed on ships equipped with measures against mechanical stress can also be used as onshore storage tanks, in the specification of the present invention, the structure of an LNG storage tank installed on a ship will be described as an example.

First, a typical LNG storage tank will be described with reference to FIG. 1.

FIG. 1 is a partial sectional view of a typical LNG storage tank.

Referring to FIG. 1, the LNG storage tank 10 includes: secondary heat insulating walls 22, 42 and primary heat insulating walls 24, 44 sequentially formed on a bottom surface of a hull; and secondary sealing walls 23, 43 interposed between the secondary heat insulating walls 22, 42 and primary heat insulating walls 24, 44 to seal a gap therebetween. In addition, a primary sealing wall 50 is disposed on the primary heat insulating walls 24, 44.

The LNG storage tank 10 includes: corner structures 20 disposed at inner corners of the storage tank; anchor structures 30 disposed at certain intervals on the bottom surface; and planar structures 40 interposed between the corner structures 20 or the anchor structures 30 to be slidable. Here, the corner structures 20, the anchor structures 30, and the planar structures 40 are preliminarily manufactured as unit modules, and then assembled into the storage tank 10, and the primary sealing wall 50 is disposed thereon to seal the heat insulating wall in a liquid-tight manner, thereby providing an inner space for storing LNG.

The corner structure 20, the anchor structure 30, and the planar structure 40 include the primary heat insulating walls 24, 34, 44, the secondary heat insulating walls 22, 32, 42, and the secondary sealing walls 23, 43, and are collectively referred to as heat insulating wall structures 20, 30, 40, respectively.

In the heat insulating wall structures 20, 30, 40, contact surfaces between the secondary sealing wall and the heat insulating wall of each of the unit modules are bonded together via adhesives. Generally, the secondary heat insulating walls 22, 42 are composed of polyurethane foam, which is an insulating material, and a plate attached under the polyurethane foam. The primary heat insulating walls 24, 44 are composed of polyurethane foam and a plate adhered thereto with an adhesive. The primary heat insulating walls 24, 34, 44 are disposed above the secondary heat insulating walls 22, 32, 42, respectively.

In addition, the secondary heat insulating wall 42 of the planar structure 40 is formed at a lower end thereof with a flange 42a, which is larger than the secondary heat insulating wall 42. The flange 42a is inserted into a groove formed in a lower end of the anchor structure 30 to be slidable to some extent.

In the illustrated example, each of the anchor structures 30 includes an anchor support rod 36, a lower securing member 37, a secondary anchor insulation wall 32 and a primary anchor insulation wall 34, and the secondary sealing walls 23, 43 are connected to each other between the secondary anchor insulation wall 32 and the primary anchor insulation wall 34. The anchor support rod 36 is connected at one end thereof to the primary sealing wall 50 and is connected at the other end thereof to the inner wall 420 of the hull by the securing member 37.

The primary sealing wall 50 is welded to an upper end of the anchor support rod 36 of the anchor structure 30.

The anchor structure 30 is placed at a connection point between the neighboring planar structures 40 to interconnect the planar structures, and the planar structure 40 is secured to the inner wall 420 of the hull or the bulkhead 440, constituting the storage tank 10. In addition, the securing member 37 of the anchor structure 30 is disposed around the anchor support rod 36.

Next, another exemplary typical LNG storage tank will be described with reference to FIGS. 2 and 3. FIG. 2 is a view of an anchor member of another exemplary typical LNG storage tank, and FIG. 3 is a partial sectional view of the exemplary LNG storage tank.

Referring to FIG. 2, the anchor member 110 of the exemplary LNG storage tank has a truncated conical shape with a flat top surface. The truncated conical anchor member 110 has a closed upper surface and an open lower surface and has a body that widens toward an inner surface of the storage tank.

The anchor member 110 is formed under the conical body 111 with a securing portion 112 for securing the anchor member 110 to the inner surface of the storage tank, that is, an inner wall or a surface of a bulkhead.

In addition, the securing portion 112 has a plurality of through-holes 112a formed at regular intervals, such that a plurality of stud bolts 61 securely mounted on the inner surface of the storage tank 10 can be inserted into the respective through-holes 112a and then secured by nuts 62 (see FIG. 3).

Further, a step is formed above the conical body 111 of the anchor member 110 to form two joints 113, 114; a first sealing film 51 is securely mounted on the first joint 113 by welding; and a second sealing film 52 is securely mounted on the second joint 114 by welding.

In the typical LNG storage tank shown in FIG. 1, the heat insulating wall structure is composed of the primary and secondary heat insulating walls and the primary and secondary sealing walls and thus has a complicated structure. In addition, the structure for connecting the secondary sealing wall of the LNG storage tank is complicated, and installation of the heat insulating wall is not easy. Further, there is a possibility that sealing reliability of the secondary sealing wall is reduced (LNG leakage), since the structure of a connection of the anchor structure or the secondary sealing wall is complicated, and installation of the anchor structure or the secondary sealing wall is difficult.

In the typical LNG storage tank shown in FIGS. 2 and 3, since the joints and securing portion of the anchor member are not movable, it is difficult to cope with deformation of the hull and to eliminate stress concentration on the heat insulation system subjected to the load of LNG. In addition, there is a problem in that it is difficult to manufacture the anchor member due to the complicated shape thereof.

DISCLOSURE

Technical Problem

It is an aspect of the present invention to provide an anchor structure and anchor member for an LNG storage tank, which can improve ease of installation and fabrication, can actively cope with deformation of a hull, and can relieve stress concentration on an insulation system subjected to the load of LNG.

Technical Solution

In accordance with one aspect of the present invention, there is provided an anchor structure for connecting a sealing wall to an inner wall of an LNG storage tank, including: an anchor member having a joint joined to the sealing wall and horizontally slidable; and an insulator formed around the anchor member, wherein the sealing wall includes a primary sealing wall directly contacting LNG and a secondary sealing wall disposed under the primary sealing wall, and the primary sealing wall and the secondary sealing wall are joined to the joint of the anchor member.

The joint may include a first joint joined to the secondary sealing wall and a second joint joined to the primary sealing wall.

A support board may be interposed between the primary sealing wall and the secondary sealing wall to maintain a constant distance therebetween.

The anchor member may include an anchor support rod passing through the anchor structure and an anchor support plate perpendicularly connected to the anchor support rod and placed on the insulator.

The first joint may include a first cap portion joined to the secondary sealing wall and a first flange radially extending from a lower end of the first cap portion, and the first flange adjoins the anchor support plate without being secured to the anchor support plate.

The anchor member may further include an anchor support cap composed of a second cap portion and a second flange radially extending from a lower end of the second cap portion, wherein the second flange covers the first flange and an edge of the second flange is secured to the anchor support plate by welding.

The anchor member may include an anchor support rod passing through the anchor structure, and the anchor structure may further include an anchor support bolt cap disposed under the insulator and having a through-hole through which the anchor support rod can pass.

The anchor support rod may have a threaded groove formed at a lower end thereof such that the lower end of the anchor support rod having passed through the through-hole can be coupled to an anchor member securing nut.

In accordance with another aspect of the present invention, there is provided an LNG storage tank, including: a heat insulating wall disposed on an inner wall of the storage tank to form a heat insulating layer; a sealing wall disposed on an upper surface of the heat insulating wall to seal the LNG storage tank in a liquid-tight manner; and an anchor structure connecting the sealing wall to the inner wall of the storage tank, wherein the anchor structure includes an anchor member having a joint joined to the sealing wall and horizontally slidable.

The sealing wall may include a primary sealing wall directly contacting LNG and a secondary sealing wall disposed under the primary sealing wall, and the joint may include a first joint joined to the secondary sealing wall and a second joint joined to the primary sealing wall.

The anchor structure may further include an insulator formed around the anchor member, and the anchor member may include an anchor support rod passing through the anchor structure and an anchor support plate perpendicularly connected to the anchor support rod and placed on the insulator.

The first joint may include a first cap portion joined to the secondary sealing wall and a first flange radially extending from a lower end of the first cap portion, and the first flange adjoins the anchor support plate without being secured to the anchor support plate.

The anchor member may further include an anchor support cap composed of a second cap portion and a second flange radially extending from a lower end of the second cap portion.

The second flange may cover the first flange and an edge of the second flange may be secured to the anchor support plate by welding.

The anchor structure may further include an insulator formed around the anchor member, the anchor member may include an anchor support rod passing through the anchor structure, and the anchor structure may further include an anchor support bolt cap disposed under the insulator and having a through-hole through which the anchor support rod can pass.

The anchor support rod may have a threaded groove formed at a lower end thereof such that the lower end of the anchor support rod having passed through the through-hole can be coupled to an anchor member securing nut.

In accordance with a further aspect of the present invention, there is provided an anchor structure for connecting a sealing wall to an inner wall of an LNG storage tank, including: an anchor member including a joint joined to the sealing wall and an anchor support rod passing through the anchor structure; an insulator having a first through-hole through which the anchor support rod can pass and formed around the anchor member; and an anchor support bolt cap disposed under the insulator and composed of a cap portion having a second through-hole through which the anchor support rod can pass and a flange radially extending from a lower end of the cap portion, wherein the anchor support rod has a threaded groove formed at a lower end thereof such that the lower end of the anchor support rod having passed through the through-hole is coupled to an anchor member securing nut to be secured to the anchor support bolt cap, and wherein the anchor support rod is movable up and down.

The anchor structure may further a first anchor lower plate attached to a lower end of the insulator and a second anchor lower plate disposed under the first anchor lower plate, wherein the anchor support bolt cap may be inserted between the first anchor lower plate and the second anchor lower plate.

The first anchor lower plate may have a third through-hole through which the anchor support rod can pass, and the second anchor lower plate may have a fourth through-hole through which the anchor support rod can pass, wherein the third through hole may be sized to allow the anchor support rod and the first anchor lower plate to be spaced apart from one another, and wherein the fourth through hole may be sized to allow the anchor support rod and the second anchor lower plate to be spaced apart from one another.

In accordance with yet another aspect of the present invention, there is provided an LNG storage tank, including: a heat insulating wall disposed on an inner wall of the storage tank to form a heat insulating layer; a sealing wall disposed on an upper surface of the heat insulating wall to seal the LNG storage tank in a liquid-tight manner; and an anchor structure connecting the sealing wall to the inner wall of the storage tank, wherein the anchor member includes an anchor support rod passing through the anchor structure and the anchor support rod is movable up and down.

The anchor structure may include: an insulator having a first through-hole through which the anchor support rod can pass and formed around the anchor member; and an anchor support bolt cap disposed under the insulator and composed of a cap portion having a second through-hole through which the anchor support rod can pass and a flange radially extending from a lower end of the cap portion, wherein the anchor support rod may have a threaded groove formed at a lower end thereof such that the lower end of the anchor support rod having passed through the through-hole can be coupled to an anchor member securing nut to be secured to the anchor support bolt cap.

The anchor structure may further a first anchor lower plate attached to a lower end of the insulator and a second anchor lower plate disposed under the first anchor lower plate, and the anchor support bolt cap may be inserted between the first anchor lower plate and the second anchor lower plate.

The first anchor lower plate may have a third through-hole through which the anchor support rod can pass, and the second anchor lower plate may have a fourth through-hole through which the anchor support rod can pass, wherein the third through hole may be sized to allow the anchor support rod and the first anchor lower plate to be spaced apart from one another, and wherein the fourth through hole may be sized to allow the anchor support rod and the second anchor lower plate to be spaced apart from one another.

The anchor member may have a joint joined to the sealing wall and horizontally slidable.

In accordance with yet another aspect of the present invention, there is provided an anchor structure for connecting a sealing wall to an inner wall of an LNG storage tank, including: an anchor member having a joint joined to the sealing wall and horizontally slidable; an insulator formed around the anchor member; a first anchor lower plate attached to a lower end of the insulator; a second anchor lower plate disposed under the first anchor lower plate; and a reinforcing plate interposed between the first anchor lower plate and the second anchor lower plate.

In accordance with yet another aspect of the present invention, there is provided an LNG storage tank including: a heat insulating wall disposed on an inner wall of the storage tank to form a heat insulating layer; a sealing wall disposed on an upper surface of the heat insulating wall to seal the LNG storage tank in a liquid-tight manner; and an anchor structure connecting the sealing wall to the inner wall of the storage tank, wherein the anchor structure includes: an anchor member having a joint joined to the sealing wall and horizontally slidable; an insulator formed around the anchor member; a first anchor lower plate attached to a lower end of the insulator; a second anchor lower plate disposed under the first anchor lower plate; and a reinforcing plate interposed between the first anchor lower plate and the second anchor lower plate.

Advantageous Effects

According to the present invention, a joint of the anchor member joined to the sealing wall can horizontally slide, thereby actively coping with deformation of a hull, and a lower portion of an anchor support rod is movable up and down, thereby relieving stress concentration on a heat insulation system under the load of LNG.

In addition, according to the present invention, a metal reinforcement plate is interposed between a first anchor lower plate and a second anchor lower plate, thereby improving strength of an anchor structure.

EMBODIMENTS

Figure 1:
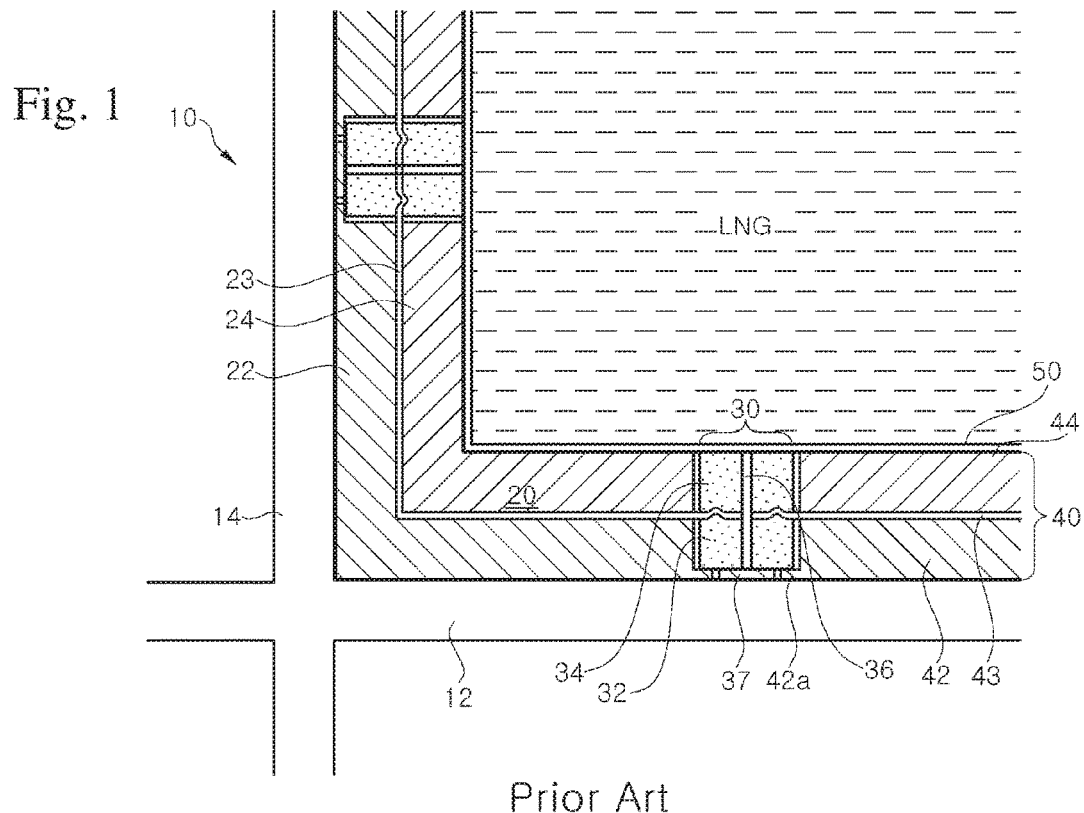
FIG. 1 is a partial sectional view of a typical LNG storage tank.
Figure 2:
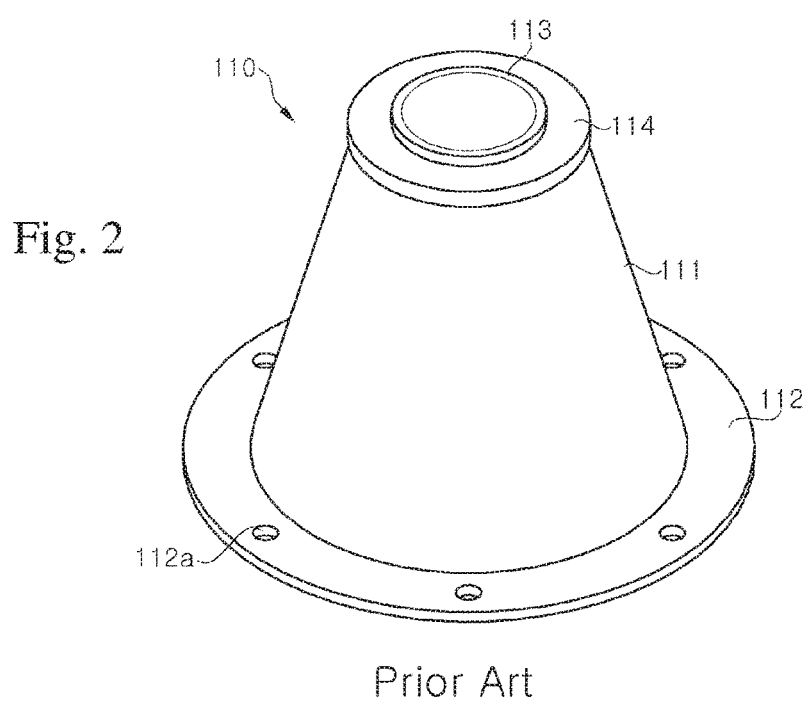
FIG. 2 is a perspective view of an anchor member of another typical LNG storage tank.
Figure 3:
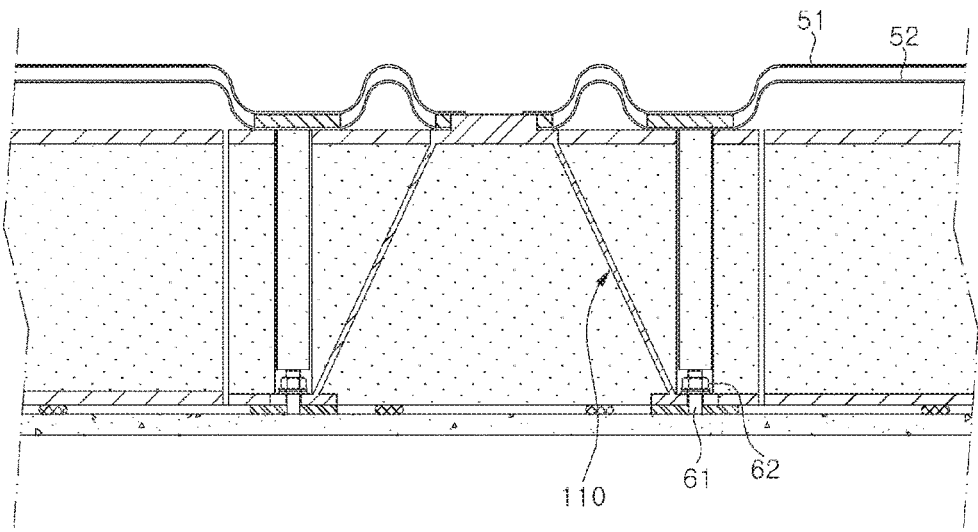
FIG. 3 is a partial sectional view of another typical LNG storage tank.

Hereinafter, embodiments of the present invention will be described with reference to the accompanying drawings. It should be noted that like components will be denoted by like reference numerals throughout the specification and the accompanying drawings. In addition, descriptions of details apparent to those skilled in the art will be omitted for clarity.

Figure 4:
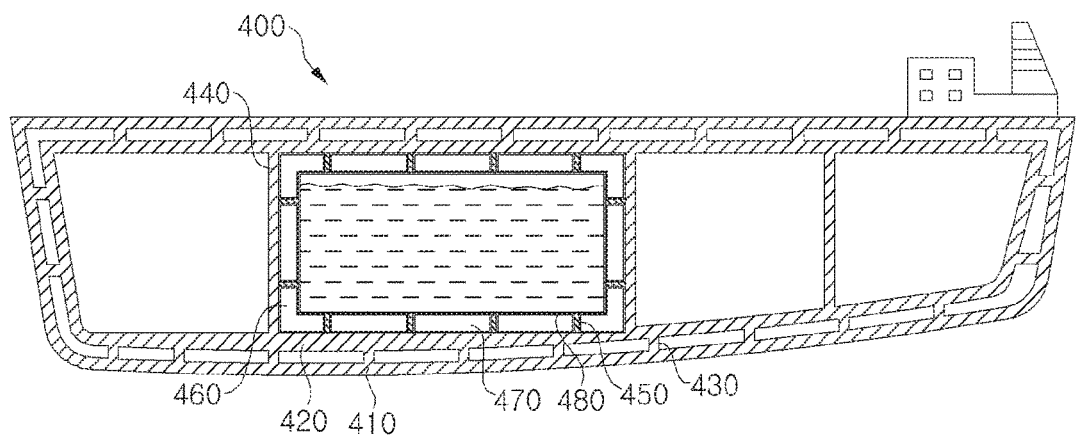
FIG. 4 is a side-sectional view of an exemplary ship having an LNG storage tank according to one embodiment of the present invention.
Figure 5:
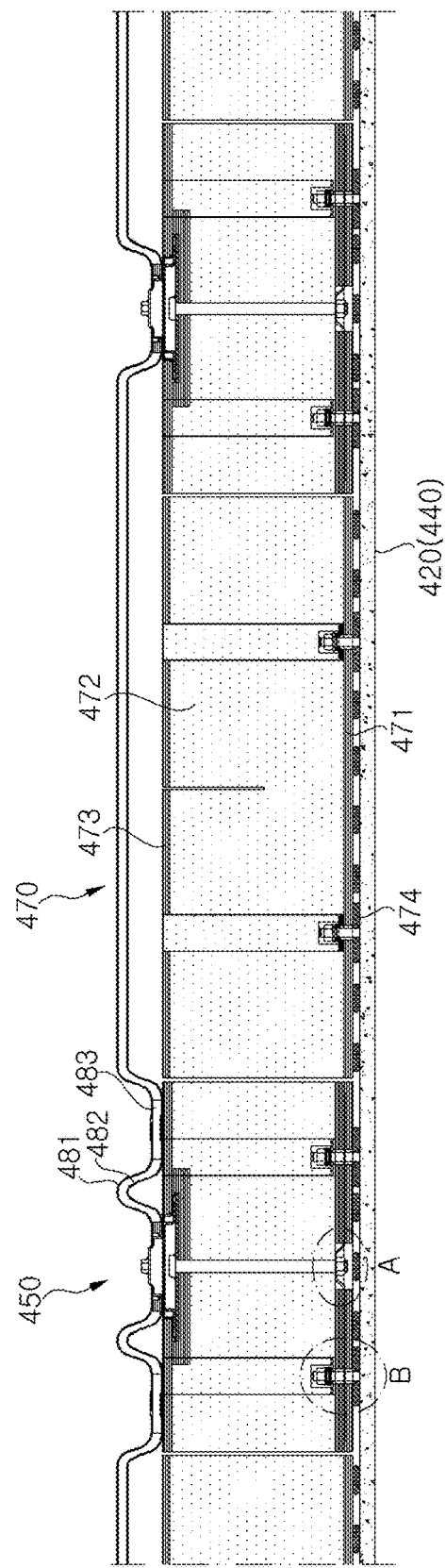
FIG. 5 is an enlarged sectional view of a portion of the LNG storage tank according to the embodiment of the present invention.

First, a structure of a ship having an LNG storage tank according to one embodiment of the present invention will be described with reference to FIGS. 4 and 5. FIG. 4 is a sectional view of an exemplary ship having an LNG storage tank according to one embodiment of the present invention and FIG. 5 is an enlarged sectional view of a portion of the LNG storage tank according to the embodiment of the present invention, more particularly, a heat insulating wall.

Referring to FIG. 4, the LNG storage tank according to the embodiment of the present invention may be installed in a ship 400, which is composed of a hull having a double structure of an outer wall 410 forming an outer shape and an inner wall 420 formed inside the outer wall 410. The inner wall 420 and the outer wall 410 of the ship 400 may be connected to each other through a connecting rib 430 to be integrally formed with each other. Alternatively, the ship 400 may be composed of a hull having a single structure without the inner wall 420. In addition, only an upper portion of the ship 400 may be formed as a single deck and the outer shape of the deck may vary depending on the size or storage capacity of the ship 400.

Further, the interior of the inner wall 420 may be divided by one or more bulkheads 440, which may also form a cofferdam.

A sealing wall 480 seals the storage tank containing LNG in a liquid-tight manner, contacts the LNG, and may have a corrugated portion to cope with temperature change caused by loading/unloading of ultra-low temperature LNG. The sealing wall 480 is connected to the inner wall 420 or the bulkhead 440 of the ship 400 through a plurality of anchor structures 450. Thus, the sealing wall 480 is not free to move with respect to the hull.

In addition, heat insulating wall structures 460, 450, 470, which are modules each constituting a layer of a heat insulating wall, are interposed between the sealing wall 480 and the inner wall 420. The heat insulating wall structures 460, 450, 470 form a heat insulating wall interposed between the inner wall 420 or the inner bulkhead 440 and the sealing wall 480 to insulate the storage tank 10.

The heat insulating wall structures 460, 450, 470 include a corner structure 460 placed at each corner, anchor structures 450 placed at regular intervals on the inner wall of the hull, and a planar structure 470 placed on a plane between the corner structures 460 or between the anchor structures 450.

As described above, in the present invention, the sealing wall 480 is mainly supported by the anchor structures 450, and the planar structure 470 only supports the load of LNG received inside the sealing wall 480 and is not directly coupled to the sealing wall 480.

Each of the anchor structures 450 is mounted on the inner wall 420 of the storage tank or the bulkhead 440 and is secured by an anchor member passing through the anchor structure 450.

The planar structure 470 is interposed between the anchor structures 450 or between the corner structures 460 and is mounted on the inner wall 420 of the tank through a plurality of connecting members. In other words, the planar structure 470 is installed by fastening a planar lower plate of the planar structure 470 to a stud bolt welded to the inner wall 420 of the hull with a nut. The planar structure 470 may be separated a predetermined distance (1 mm to 4 mm) from a side surface of the corner structure 460 or the anchor structure 450 to create a gap therebetween. Such a gap provides a space for the planar structure 470 to move upon deformation of the hull such that the deformation can be absorbed. Accordingly, the planar structure 470 can be slightly moved (slid) in the horizontal direction with respect to a bottom surface.

The planar structure 470 includes a planar lower plate 471 adjoining the inner wall 420, a planar insulator 472 formed on the planar bottom plate 471, and a planar upper plate 473 formed on the planar insulator 472.

The planar lower plate 471 and the planar upper plate 473 are formed of plywood and the planar insulator 472 is formed of polyurethane foam.

In addition, the sealing wall 480 directly contacting LNG is disposed on the heat insulating wall structures 450, 470. The sealing wall 480 has a dual structure, that is, is composed of a primary sealing wall 481 directly contacting LNG and a secondary sealing wall 482 under the primary sealing wall 481. Here, the primary sealing wall 481 and the secondary sealing wall 482 are spaced apart from each other by a predetermined distance. The sealing wall 480 can undergo slight expansion or contraction due to temperature variation. In this case, since the primary sealing wall 481 and the secondary sealing wall 482 can be damaged by contact, a support board 483 is provided to maintain a constant distance between the primary sealing wall 481 and the secondary sealing wall 155 in order to prevent contact between the primary sealing wall and the secondary sealing wall.

The sealing wall 480 is formed with a plurality of corrugated portions to prevent damage upon expansion or contraction. The corrugated portions expand or contract upon temperature change caused by loading/unloading of LNG, thereby preventing damage due to thermal deformation applied to the sealing wall 480. In addition, the sealing wall 480 is secured to the anchor member of the anchor structure 450 by welding.

Although the sealing wall 480 is shown as having a dual structure of the primary sealing wall 481 and the secondary sealing wall 482, it should be understood that the sealing wall 480 may have a multilayer structure of three or more layers.

Figure 6:
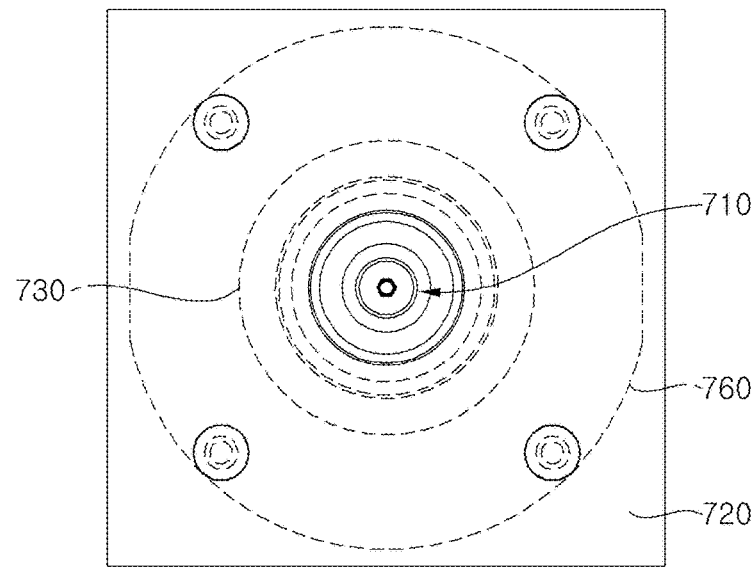
FIG. 6 is a plan view of an anchor structure according to one embodiment of the present invention.
Figure 10:
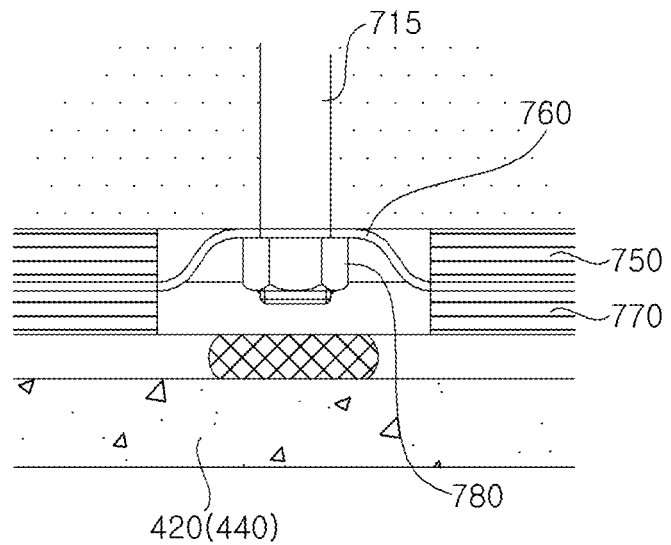
FIG. 10 is an enlarged view of portion A of FIG. 5.
Figure 11:
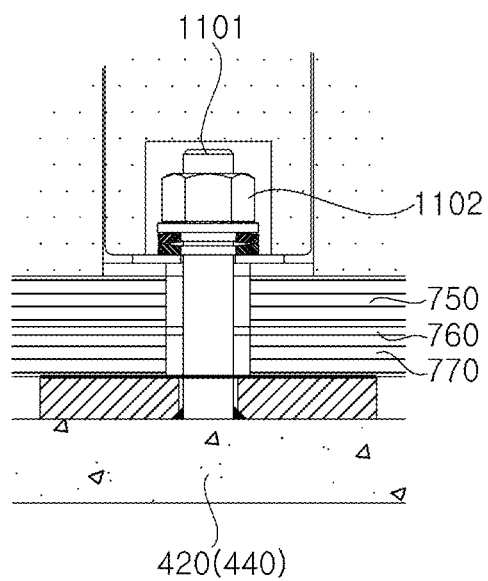
FIG. 11 is an enlarged view of portion B of FIG. 5.

Next, an anchor structure and an anchor member according to one embodiment of the present invention will be described with reference to FIGS. 6 to 11. FIG. 6 is a plan view of an anchor structure according to one embodiment of the present invention, FIG. 7 is a sectional view of the anchor structure according to the embodiment of the present invention, FIG. 8 is an exploded view of the anchor structure according to the embodiment of the present invention, FIG. 9 is a sectional view of an anchor member according to one embodiment of the present invention, FIG. 10 is an enlarged view of portion A of FIG. 5, and FIG. 11 is an enlarged view of portion B of FIG. 5.

Figure 7:
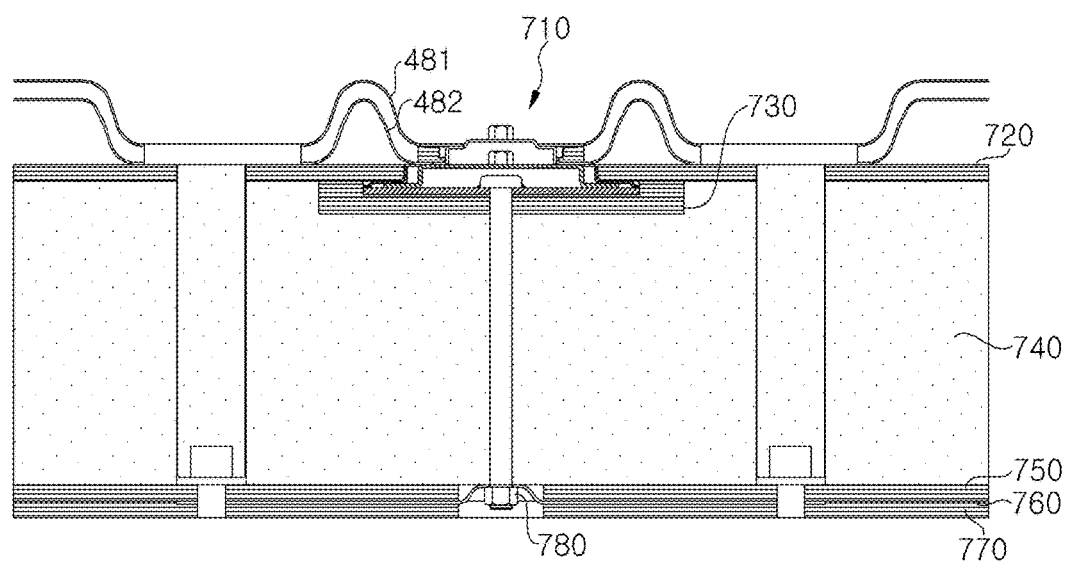
FIG. 7 is a sectional view of the anchor structure according to the embodiment of the present invention.
Figure 8:
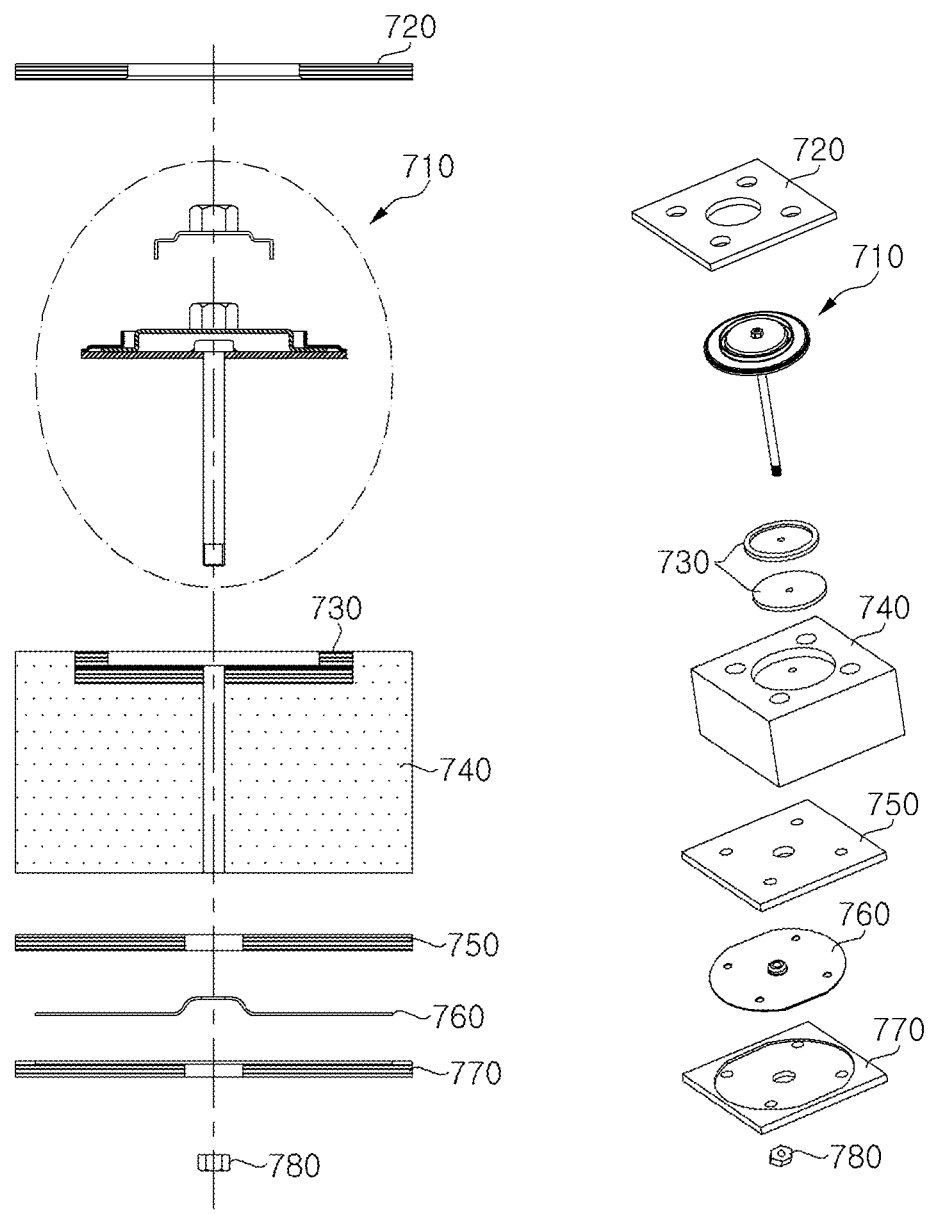
FIG. 8 is an exploded view of the anchor structure according to the embodiment of the present invention.

Referring to FIGS. 6 to 8, the anchor structure according to this embodiment includes an anchor member 710, a first anchor upper plate 720, a second anchor upper plate 730, an insulator 740, a first anchor lower plate 750, an anchor support bolt cap 760, a second anchor lower plate 770, and an anchor member securing nut 780.

The anchor member 710 serves to connect the sealing wall to the inner wall of the LNG storage tank to secure the sealing wall. The anchor member according to the embodiment has joints joined to the sealing wall and horizontally slidable. Accordingly, when the ship shakes, the joints can horizontally slide, thereby actively coping with deformation of the hull.

Figure 9:
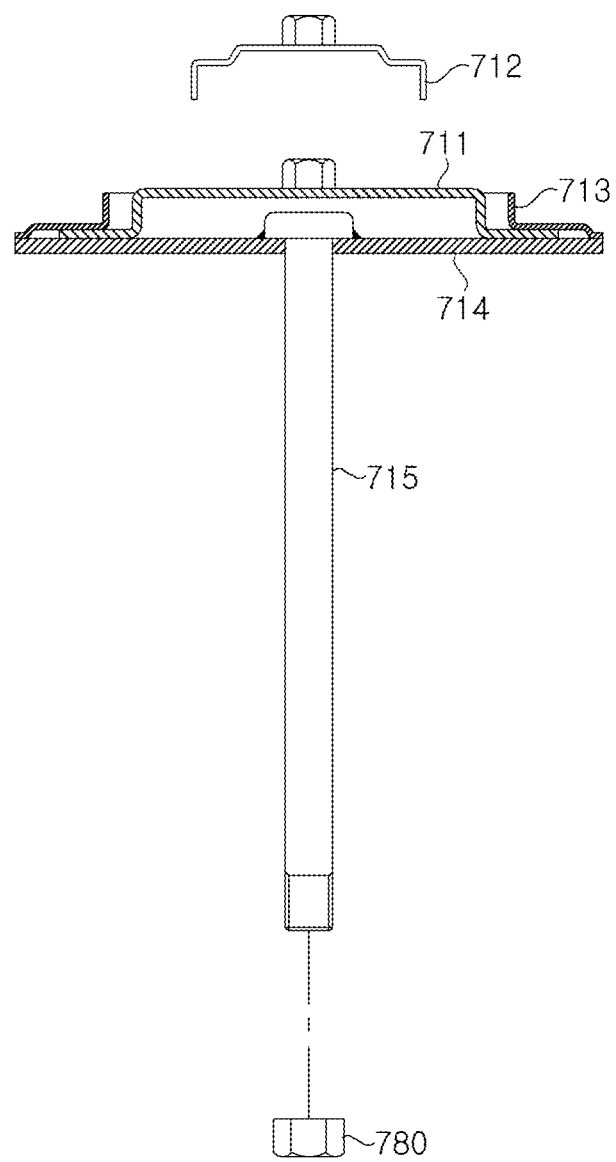
FIG. 9 is a sectional view of an anchor member according to one embodiment of the present invention.

Referring to FIG. 9, the anchor member 710 includes a first joint 711, a second joint 712, an anchor support cap 713, an anchor support plate 714, and an anchor support rod 715.

As shown in FIG. 9, the anchor support rod 715 is perpendicularly connected to the anchor support plate 714 by welding.

The first joint 711 is a portion to which the secondary sealing wall 482 is joined and includes a cap portion to which the secondary sealing wall 482 is joined and a flange portion that extends radially from the lower end of the cap portion. Although the first joint 711 is placed on the anchor support plate 714 such that the first flange portion of the first joint 711 adjoins the anchor support plate 714, the first joint 711 is not secured to the anchor support plate 714. The anchor support cap 713 is placed on the first joint 711, and an edge of the anchor support cap 713 is welded to the anchor support plate 714. The anchor support cap 713 includes a cap portion and a flange portion extending radially from a lower end of the cap portion. As shown in FIG. 9, an edge of the flange portion of the anchor support cap 713 is secured to the anchor support plate 714 by welding such that the flange portion of the anchor support cap 713 covers the flange portion of the first joint 711. Thus, the first joint 711 is horizontally slidable inside the anchor support cap 713. In other words, when the ship shakes, the first joint 711 can horizontally slide, thereby actively coping with deformation of the hull.

The second joint 712 is a portion to which the primary sealing wall 481 is joined, and is placed on the first joint 711. The second joint 712 may be welded to an upper side of the first joint 711. In manufacture of the LNG storage tank, after the anchor structure 450 is formed without the second joint 712 attached to the anchor member 710, the anchor structure 450 is mounted on an inner wall of the LNG storage tank. Then, after the secondary sealing wall 482 is welded to the first joint 711, the second joint 712 is welded to the upper side of the first joint 711 and the primary sealing wall 481 is welded to the second joint 712.

The anchor support rod 715 passes through the anchor structure 450 and is formed at a lower end thereof with a threaded groove to be coupled to the anchor member securing nut 780 in order to secure the anchor member 710 to other components of the anchor structure 450.

The insulator 740 is integrally formed around the anchor member 710 using polyurethane foam, reinforced polyurethane foam, or the like. The first anchor upper plate 720 and the second anchor upper plate 730 are attached to an upper end of the insulator 740, and the first anchor lower plate 750 and the second anchor lower plate 770 are attached to a lower end of the insulator 740. The first anchor upper plate 720, the second anchor upper plate 730, the first anchor lower plate 750 and the second anchor lower plate 770 may be formed of plywood.

The anchor support bolt cap 760 is interposed between the first anchor lower plate 750 and the second anchor lower plate 770, and is composed of a second cap portion and a second flange portion extending radially from a lower end of the second cap portion. In addition, the second cap portion is formed with a through-hole such that the anchor support rod 715 can pass therethrough.

Referring to FIG. 8, the first anchor upper plate 720, the second anchor upper plate 730, the insulator 740, the first anchor lower plate 750, and the second anchor lower plate 770 are also formed with through-holes, respectively, such that the anchor support rod 715 can pass therethrough. Thus, after the anchor support rod 715 of the anchor member 710 passes through the first anchor upper plate 720, the second anchor upper plate 730, the insulator 740, the first anchor lower plate 750, the anchor support bolt cap 760, and the second anchor lower plate 770, the threaded groove formed at the lower end of the anchor support rod 715 is coupled to the anchor member retaining nut 780 such that the anchor member 710 is secured to other components of the anchor structure 450.

FIG. 10 is an enlarged view of portion A of FIG. 5. Specifically, FIG. 10 is a view showing a portion at which the anchor support rod 715 is coupled to the anchor member securing nut 780. Referring to FIG. 10, a portion of the anchor support bolt cap 760 coupled to the anchor support rod 715 has a cap shape, and the through holes of the first anchor lower plate 750 and the second anchor lower plate 770 have a larger cross-sectional area than the anchor support rod, whereby the anchor support rod 715 can be moved up and down. In other words, the portion of the anchor support bolt cap 760 coupled to the anchor support rod 715 has a cap shape rather than being tight, and the first anchor lower plate 750 and the second anchor lower plate 770 are spaced apart from the anchor support rod, whereby a lower portion of the anchor support rod 715 is movable up and down. When the LNG storage tank is filled with a large amount of LNG, pressure is applied to the anchor structure 450 due to the load of the LNG. As a result, the insulator 740 formed of polyurethane foam contracts, whereas the anchor support rod 715 formed of a metal does not contract. As such, according to the present invention, the anchor support rod 715 can be moved up and down, whereby it is possible to relieve stress concentration on the heat insulation system under the load of LNG.

Referring to FIGS. 7 and 8 again, the anchor support bolt cap 760 may be inserted between the first anchor lower plate 750 and the second anchor lower plate 770 to function as a metal reinforcement plate. Although, in FIG. 8, the anchor support bolt cap 760 is shown as having a circular shape, the anchor support bolt cap may also be formed in a rectangular shape, like the first anchor lower plate 750 and the second anchor lower plate 770.

As shown in FIGS. 6 to 8, each of the first anchor upper plate 720, the second anchor upper plate 730, the insulator 740, the first anchor lower plate 750, the anchor support bolt cap 760, and the second anchor lower plate 770 is formed at an edge thereof with a through-hole to secure the anchor structure to the hull. Although, in FIGS. 6 and 8, four through-holes are shown, it should be understood that the present invention is not limited thereto.

FIG. 11 is an enlarged view of portion B in FIG. 5. The inner wall 420 and the bulkhead 440 of the LNG storage tank are securely mounted with the stud bolts 1101 in advance at positions where the anchor structure 450 is to be installed. Referring to FIG. 11, the stud bolt 1101 is inserted into the through holes of the first anchor lower plate 750, the anchor support bolt cap 760, and the second anchor lower plate 770 and then secured by a nut 1102.

Figure 12:
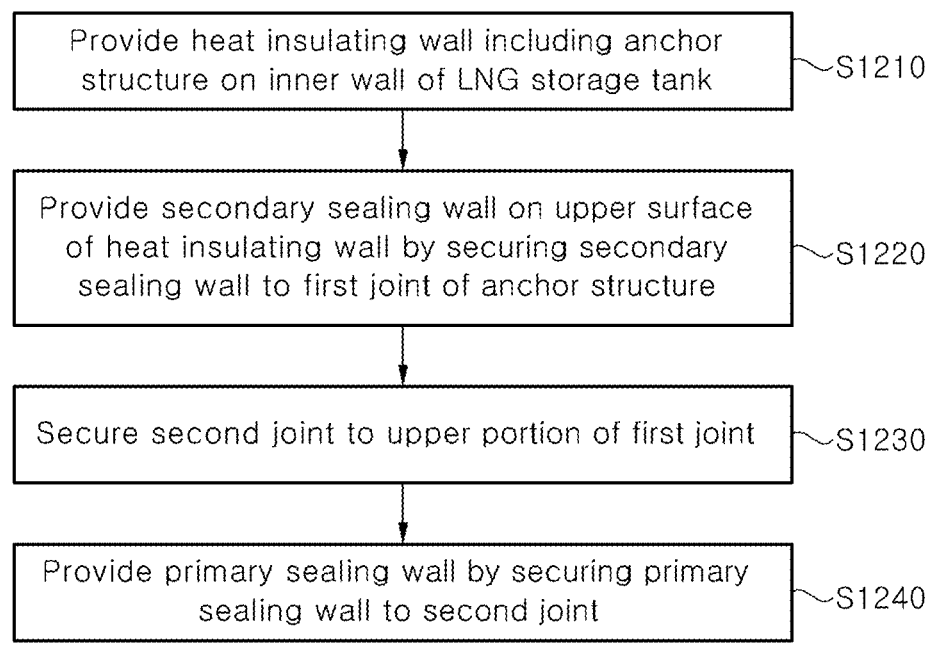
FIG. 12 is a flowchart illustrating a method of manufacturing an LNG storage tank according to one embodiment of the present invention.

Next, a method of manufacturing an LNG storage tank according to one embodiment of the present invention will be described with reference to FIG. 12. FIG. 12 is a flowchart illustrating the method of manufacturing an LNG storage tank according to the embodiment of the present invention.

Referring to FIG. 12, first, the heat insulating wall including the anchor structure 450 is installed on the inner wall 420 of the LNG storage tank and the bulkhead 440 (S1210). In step S1210, the anchor structure 450, the corner structure 460, and the planar structure 470 are secured to the inner wall 420 of the LNG storage tank and the bulkhead 440. Here, the stud bolts previously mounted on the inner wall 420 of the LNG storage tank and the bulkhead 440 may be inserted into the through holes of the anchor structure 450, the corner structure 460, and the planar structure 470, and then secured by the nut.

Then, the secondary sealing wall is secured to the first joint 711 of the anchor structure 450 to install the secondary sealing wall on an upper surface of the heat insulating wall (S1220). Then, the second joint 712 is secured to the upper portion of the first joint 711 by welding (S1230), and the primary sealing wall is secured to the second joint 712 to install the primary sealing wall (S1240).

Although some embodiments have been described herein, it should be understood by those skilled in the art that these embodiments are given by way of illustration only, and that various modifications, variations and alterations can be made without departing from the spirit and scope of the invention. Therefore, the embodiments disclosed herein should not be construed as limiting the technical scope of the present invention, but should be construed as illustrating the present invention. The scope of the present invention should be interpreted according to the appended claims and equivalents thereof.

The invention claimed is:

1. An anchor structure for connecting a sealing wall to an inner wall of an LNG storage tank, comprising:
   an anchor member having a joint joined to the sealing wall and horizontally slidable; and
   an insulator formed around the anchor member,
   wherein the sealing wall comprises a primary sealing wall directly contacting liquefied natural gas (LNG) and a secondary sealing wall disposed under the primary sealing wall, the primary sealing wall and the secondary sealing wall being joined to the joint of the anchor member,
   wherein the joint comprises a first joint joined to the secondary sealing wall and a second joint joined to the primary sealing wall.

2. The anchor structure according to claim 1, wherein a support board is interposed between the primary sealing wall and the secondary sealing wall to maintain a constant distance therebetween.

3. The anchor structure according to claim 1, wherein the anchor member comprises an anchor support rod passing through the anchor structure and an anchor support plate perpendicularly connected to the anchor support rod and placed on the insulator.

4. The anchor structure according to claim 3, wherein the first joint comprises a first cap portion joined to the secondary sealing wall and a first flange radially extending from a lower end of the first cap portion, and the first flange adjoins the anchor support plate without being secured to the anchor support plate.

5. The anchor structure according to claim 4, wherein the anchor member further comprises an anchor support cap composed of a second cap portion and a second flange radially extending from a lower end of the second cap portion, the second flange covers the first flange, and an edge of the second flange is secured to the anchor support plate by welding.

6. The anchor structure according to claim 1, wherein the anchor member comprises an anchor support rod passing through the anchor structure,
   wherein the anchor structure further comprises an anchor support bolt cap disposed under the insulator, and
   wherein the anchor support rod can pass through the anchor support bolt cap.

7. The anchor structure according to claim 6, wherein the anchor support rod has a threaded groove formed at a lower end thereof such that the lower end of the anchor support rod having passed through the anchor support bolt cap is coupled to an anchor member securing nut.

8. The anchor structure according to claim 6,
   wherein the insulator has a first through-hole through which the anchor support rod can pass,
   wherein the anchor support bolt cap composes of a cap portion having a second through-hole through which the anchor support rod can pass and a flange radially extending from a lower end of the cap portion,
   wherein the anchor support rod has a threaded groove formed at a lower end thereof such that the lower end of the anchor support rod having passed through the first through-hole and the second through-hole is coupled to an anchor member securing nut to be secured to the anchor support bolt cap, and
   wherein the anchor support rod is movable up and down.

9. The anchor structure according to claim 8, further comprising:
   a first anchor lower plate attached to a lower end of the insulator; and
   a second anchor lower plate disposed under the first anchor lower plate,
   wherein the anchor support bolt cap is inserted between the first anchor lower plate and the second anchor lower plate.

10. The anchor structure according to claim 9, wherein the first anchor lower plate has a third through-hole through which the anchor support rod can pass, and the second anchor lower plate has a fourth through-hole through which the anchor support rod can pass, the third through hole being sized to allow the anchor support rod and the first anchor lower plate to be spaced apart from one another, and the fourth through hole being sized to allow the anchor support rod and the second anchor lower plate to be spaced apart from one another.

11. The anchor structure according to claim 1, further comprising:
   a first anchor lower plate attached to a lower end of the insulator;
   a second anchor lower plate disposed under the first anchor lower plate; and
   a reinforcing plate interposed between the first anchor lower plate and the second anchor lower plate.

12. An LNG storage tank comprising the anchor structure according to claim 1, comprising:
   a heat insulating wall disposed on an inner wall of the storage tank to form a heat insulating layer;
   a sealing wall disposed on a surface of the heat insulating wall to seal the LNG storage tank in a liquid-tight manner; and
   the anchor structure connecting the sealing wall to the inner wall of the storage tank,
   wherein the anchor structure comprises an anchor member having a joint joined to the sealing wall and horizontally slidable.

13. A ship comprising the LNG storage tank according to claim 12.

* * * * *